US010320790B1

(12) United States Patent
Roth et al.

(10) Patent No.: US 10,320,790 B1
(45) Date of Patent: Jun. 11, 2019

(54) TEMPORARILY PROVIDING A SOFTWARE PRODUCT ACCESS TO A RESOURCE

(71) Applicant: Amazon Technologies, Inc., Reno, NV (US)

(72) Inventors: Gregory Branchek Roth, Seattle, WA (US); Graeme David Baer, Bellevue, WA (US); Jacques Daniel Thomas, Seattle, WA (US); Nicholas Andrew Gochenaur, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 575 days.

(21) Appl. No.: 14/475,306

(22) Filed: Sep. 2, 2014

(51) Int. Cl.
*G06F 9/50* (2006.01)
*H04L 29/06* (2006.01)
*G06Q 30/06* (2012.01)
*G06Q 40/00* (2012.01)
*G06F 21/33* (2013.01)

(52) U.S. Cl.
CPC ......... *H04L 63/10* (2013.01); *G06Q 30/0601* (2013.01); *G06Q 40/12* (2013.12); *H04L 63/20* (2013.01)

(58) Field of Classification Search
None
See application file for complete search history.

(56) References Cited

U.S. PATENT DOCUMENTS

| 7,823,124 | B2 * | 10/2010 | Sattler | G06F 9/44505 706/46 |
| 8,011,528 | B2 * | 9/2011 | Wright | B65D 21/08 220/495.08 |
| 8,769,644 | B1 * | 7/2014 | Eicken | H04L 67/1097 709/225 |
| 8,881,256 | B1 * | 11/2014 | Roth | G06Q 20/3821 705/55 |
| 8,954,574 | B1 * | 2/2015 | Chheda | G06Q 20/085 709/220 |
| 2005/0080898 | A1 * | 4/2005 | Block | G06F 17/30867 709/225 |
| 2011/0296401 | A1 * | 12/2011 | DePoy | G06F 8/60 717/174 |
| 2012/0011567 | A1 | 1/2012 | Cronk et al. | |
| 2012/0109947 | A1 * | 5/2012 | Yu | G06F 17/30584 707/725 |

OTHER PUBLICATIONS

A tenant-based resource allocation model for scaling Software-as-a-Service applications over colud computing infrastructures. Espadas et al. Elsevier(2011).*
Authentication delegation for subscription-based remote network services. Ma et al. Elsevier(2006).*

(Continued)

*Primary Examiner* — Venkat Perungavoor
(74) *Attorney, Agent, or Firm* — Lee & Hayes, P.C.

(57) ABSTRACT

Functionality is disclosed herein for providing temporary access to a resource. A software product that is executing in response to a request from a customer may access one or more resources of a software provider. The resources that may be accessed by a software product may be identified within an access policy. The customer is prevented from accessing the resource when the software product is not executing.

15 Claims, 9 Drawing Sheets

(56) References Cited

OTHER PUBLICATIONS

How to Enhance Cloud Architectures to Enable Cross-Federation. Celesti et al. IEEE(2010).*
Inter-Cloud Operations via NGSON. Shan et al. IEEE(2012).*
Developing Software Online with Platform-as-a-Service Technology .Lawton, George. IEEE (Year: 2008).*
Developing Software Online with Platform-as-a-Service Technology. Lawton, George. (Year: 2008).*
Office action for U.S. Appl. No. 14/475,314, dated Dec. 22, 2016, Both et al., "Temporarily Providing a Software Product Access to a Resource", 8 pages.

* cited by examiner

US 10,320,790 B1

TEMPORARILY PROVIDING A SOFTWARE PRODUCT ACCESS TO A RESOURCE

BACKGROUND

In some cases, it may be desirable to provide limited access to resources in a distributed computing environment. For example, when a software product is purchased by a customer, the software provider might add the customer to an access control list that specifically authorize certain customers to access the resource. The access control list might be checked each time a request is made by the customer to access a resource that is protected by the access control list to determine if the customer is authorized.

The software provider might also assign the customer individual security credentials (i.e., access keys, passwords, multi-factor authentication devices) in order to access the resource. The software provider might also request temporary security credentials from a credential service to provide customers with access to the resources.

Managing these security credentials, however, can be difficult and time consuming. For example, whenever a customer purchases a product that requires access to protected resources, or a customer cancels a subscription to the software product, the software provider may need to update the security credentials to ensure that only authorized customers can access protected resources.

It is with respect to these and other considerations that the disclosure made herein is presented.

DETAILED DESCRIPTION

Figure 1:
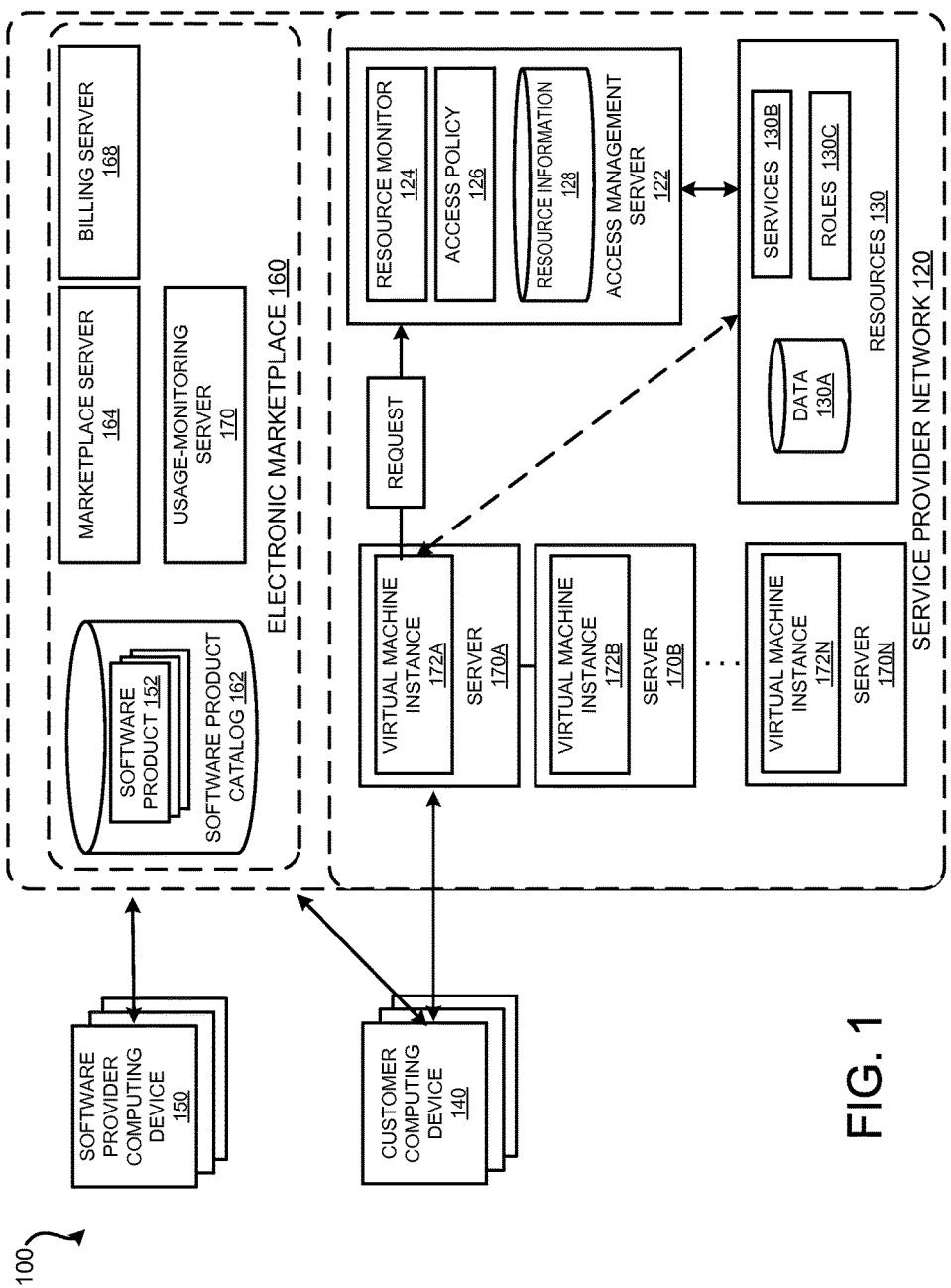
FIG. 1 is a block diagram depicting an illustrative operating environment in which access to a resource is provided to a software product or a customer.

The following detailed description is directed to technologies for temporarily providing access to a resource. Through an implementation of the technologies disclosed herein, a software product of a customer may be granted access to one or more resources (e.g., data stored in a database service or storage service) in a service provider network because the customer purchased or subscribed to the software product. Accordingly, it may be unnecessary for a software provider to update security credentials when a customer purchases a software product or cancels a subscription to the software product.

As used herein, the term "software product" refers to software and/or software services. For example, a software product may be an application, a machine image (including an operating system and software), or software as a service ("SaaS"). The software product may be available from an electronic marketplace and may be executed on an environment operated by a service provider, such as a service provider network. For example, the software product may be executed in a virtual machine that in turn executes on infrastructure operated by the service provider.

As used herein, a "purchase" of the software product may result in a one-time payment from a customer or may result in payments from a customer that are made on an ongoing basis depending upon how the software is utilized and executed. In one example, a purchase of a software product establishes a subscription to the software product that allows the customer to execute the software product for a period of time (e.g., one week, one month, one year, etc.) and/or at a specified usage fee. The specified usage fee may be based on different factors such as a time the software product is executed, a number or type of resources used by the software, a number of operations performed by the software product, and the like. While in many sections of this document a purchase is described in terms of exchange of payment for access to a software product, the disclosure contemplates purchases for zero payment. Or put another way, a software product that is conveyed to the customer for free or for a fee can be considered "purchased" for the purposes of this disclosure. In some examples, the software product may be conveyed to the customer during a free trial period.

A provider of a software product, such as a third party software provider, may offer access to one or more resources while a software product executes on a service provider network. Instead of the third party software provider having to maintain a list of customers (e.g., within an access control list) that are granted access the resource, the software product may be authorized by the third party software provider, or some other authorized user, to access the resource.

In other examples, access to a resource may be based on one or more software products that a customer has purchased. For example, access to a resource might be authorized when a customer has a subscription to one or more particular software products that are executed in a service provider network. A software provider, or some other authorized user may specify the subscription(s) (i.e., software products) that are necessary for the customer to have before the customer is authorized to access a resource. For example, the subscriptions required to access the resource might be specified in an access policy attached to the resource. The access policy may be provided by a third party (e.g., the software provider or a customer of the service provider network) or another authorized party. For example, the owner or operator of the electronic marketplace or the service provider network might specify within an access policy that a resource may be accessed when a customer has purchased a particular software product.

In some cases, the resource may be accessed by the customer whether or not the customer is currently executing the software product. For example, a customer might be authorized to access data stored in a database service offered by the service provider network based on one or more subscriptions of the customer.

In some examples, an access policy defines the resources that may be accessed. The access policy might specify what resources may be accessed by a software product while the software product is executing and/or what resources may be accessed based on the software products purchased by the customer (e.g., subscriptions). The access policy may be accessed before a customer or software product is granted access to a resource. For example, the access policy might be accessed when the software product is launched or at some other time (e.g., in response to receiving a request for a resource). The access policy might be used by an access management server when determining whether to grant access to a resource.

In some examples, the resource is a resource that is available from a service provider network. The resource might be a service provided by the service provider network, a software product, an identity, such as a role, that may be used to perform various operations and/or data that might be stored by the service provider network or some other network. For example, the service might be a database service, a storage service, a network service, or other types of services. In some examples, the resources may include other software products and/or other computing resources that are available from the service provider network. The resources made available to the software product and/or the customer might be a role that authorizes the software product and/or the customer to perform various operations, including accessing other resources.

In some examples, authorization to access the resource is based on the authorization of the software provider and/or the service provider network to access the resource. For example, the authentication credentials used to access the resource might be based on the authentication credentials used by the third party software provider to access the resource. As such, the software provider does not need to create or specify individual authentication credentials for each of the different customers of the software product. Instead, the service provider network, or some other computing device, allows the software product to access the resource even though the customer executing the software product may not have the appropriate security credentials to access the resource.

A software provider, or some other authorized user, might specify the resources that may be accessed by a software product using different mechanisms. For example, a software provider might use a graphical user interface to configure the resources that may be accessed by the software product. In other examples, the software provider might specify what subscriptions are needed to access a resource. For example, the software provider might specify that if a customer has purchased a subscription to a database software product then the customer is authorized to access data that is stored within a particular database.

Access to the resource may be configured to expire in response to different conditions. For example, access to the resource might expire when the software product is no longer executing in a service provider network. In other examples, access to the resource might expire based on an occurrence of some other event. For instance, access to the resource might automatically expire after a predetermined time period (e.g., one hour, two hours, 10 days, one month), might expire when the software product has been used a predetermined number of times, might expire when the software product has consumed a predefined number of resources, or when a subscription to the software product ends.

In some cases, the software provider may be charged to access or use the resources. In other cases, the charge to use or access these resources may be passed along to the customer. Instead of requiring a software provider to specify a list of customers that are allowed to access a resource, the resources might be accessed through execution of a software product and/or accessed when a customer has the required subscriptions. Additional details regarding the various components and processes described above for providing access to a resource will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which access to a resource is provided to a software product or a customer. As illustrated, the operating environment 100 includes one or more software provider computing devices 150, one or more customer computing devices 140 in communication with an electronic marketplace 160 and a service provider network 120.

A third party software provider, or some other authorized user, using a software provider computing device 150, may submit one or more software products 152 (e.g., virtual machine images that include software products) to the electronic marketplace 160. The electronic marketplace 160 may then make the submitted software product, as well as other software products 152 submitted to the electronic marketplace 160, available to customers.

In example embodiments, the software products 152 that are submitted to the electronic marketplace 160 may be authorized to access a resource regardless of whether or not a customer is authorized to access the resource. For example, a software product may be authorized to access a role, which includes permissions needed to access a resource. In another example, a permission may be added to an access control list of a resource indicating that a customer is be authorized to access the resource based on one or more other purchases (e.g., subscriptions) that the customer has made. As used herein, the terms "customer" and "customers" refer to existing customers of the electronic marketplace 160 as well as visitors (i.e. potential customers) to the electronic marketplace 160 that are authorized to execute a software product 152.

A software provider that submits one or more software products 152 to the electronic marketplace 160 might offer customers access to one or more resources 130 that the software provider authorizes the software product or the customer to access. Generally, the resources 130 are hosted in the service provider network 120. For example, the resources 130 might include data 130A, products 152, identities, such as roles 130C and/the services 130B. The resources 130 might be provided by one or more different services provided by the service provider network 120. For example, one service might provide access to data, another service might provide access to an execution of a software product, and the like. Access to the resources 130 might be tied to execution of a software product 152 or to subscriptions of the customer. Some example resources, include but are not limited to, a record in a non-relational database service, an object in an object storage service, a database in a relational database hosting service, a cache in a caching service, a compute instance in a compute service, a role, a cryptographic key in a key management service, a configuration of a network, a message within a queuing service, a record within a data warehouse service, or a real-time data stream within a data stream processing service.

As discussed briefly above, the software provider does not need to add customers to an access control list that specifically identifies the customers of the software provider that are authorized to access the resource. As such, the software provider does not have to worry about adding new customers to an authorized access list or removing customers when they are no longer authorized to use the software product 152. Instead, the software provider may authorize the software product 152 to access the resource or may specify the other purchased software product(s) that may be used to access a resource 130. In some cases, a customer executing the software product 152 is authorized to access the specified resource 130 while the software product 152 is executing.

In some examples, the service provider network 120 enforces access to the resources 130 based, at least in part, on a configuration or access policy that is specified by the third party software provider. For instance, the service provider network 120 might use an access policy 126 to determine what resources 130 a customer and/or a software product 152 may access. The access policy 126 may also specify permissions that specify actions that are allowed to be performed on the resource. For example, the actions might include a read action that allows reading from the resource, a write action that allows writing to the resource, a cross-service action that allows the resource to access one or more other services or resources provided by the service provider network, or the like. In some cases, a third party software provider may define what resources 130 may be accessed, and what actions may be performed on the resources, in the access policy 126. In other cases, the owner or operator of the service provider network 120 and/or the electronic marketplace 160 may specify in the access policy 126 what resources 130 may be accessed and what actions may be performed on the resources.

A customer, using a customer computing device 140, may select a software product 152 for purchase from the electronic marketplace 160. After purchasing the software product 152, the customer may configure the software product 152 and launch the software product 152 for execution in a service provider network 120 that may be operated, maintained, provided or otherwise associated with the operator of the electronic marketplace 160.

As described in more detail below, the service provider network 120 may include a collection of rapidly provisioned and, potentially, released computing resources hosted in connection with the marketplace or a third party provider. The computing resources may include a number of computing, networking and storage devices in communication with one another. In some embodiments, the computing resources may correspond to physical computing devices, such as the servers 170A-170N. In other embodiments, the computing resources may correspond to virtual machine instances, such as the virtual machine instances 172A-172N, implemented by one or more physical computing devices, such as the servers 170A-170N. In still other embodiments, computing resources may correspond to both virtual machine instances and physical computing devices.

As discussed briefly above, the software provider computing devices 150 and the customer computing devices 140 may communicate with the electronic marketplace 160. In the illustrated embodiment, the electronic marketplace 160 is illustrated as a computer environment including several computer systems that are interconnected using one or more networks. More specifically, the electronic marketplace 160 may include a marketplace server 164, a usage-monitoring server 170, an electronic software product catalog 162 including software products 152 and a billing server 168. Each of these will be described in more detail below.

It should be appreciated that the electronic marketplace 160 may have fewer or more components than are illustrated in FIG. 1. For example, while the electronic marketplace 160 is shown separately from the service provider network 120, the electronic marketplace 160 and all or a portion of the components illustrated in the electronic marketplace 160 may be provided by the service provider network 120. As another example, the usage-monitoring server 170 may be located within the service provider network 120. In addition, the electronic marketplace 160 could include various Web services and/or peer-to-peer network configurations. Thus, the depiction of the electronic marketplace 160 in FIG. 1 should be taken as illustrative and not limiting to the present disclosure.

The marketplace server 164 facilitates submission of software products 152 by software providers and browsing and acquisition by customers of software products offered through the electronic marketplace 160. Accordingly, a third party software provider, utilizing a software provider computing device 150 may submit one or more software products 152 to the electronic marketplace 160 via the marketplace server 164. The submitted software products 152 may then be included in an electronic software product catalog 162. According to an embodiment, the electronic marketplace 160 and service provider network 120 are operated and owned independently from the third party software providers that submit the software products 152 for inclusion in the electronic marketplace 160.

The software product catalog 162 includes information on the software products 152 submitted from different third party software providers and, potentially, on the software products 152 made available by the operator of the electronic marketplace 160. Accordingly, the marketplace server 164 may obtain software products from third party software providers and make the software products available to a customer from a single network resource, such as a Web site. A customer may then acquire the software product 152 from the electronic marketplace 160 and launch the software product 152 in a hosted computing environment (e.g., the service provider network 120) in a single interaction or order placed with the electronic marketplace 160. According to another embodiment, the hosted computing environment may be a different network, such as a software provider network (not shown).

If a customer does purchase a software product 152, then the marketplace server 164 may facilitate the configuration and acquisition of the software product 152. In this regard, the marketplace server 164 may receive payment information from the customer computing device 140, as well as information specifying how a service provider network 120 should implement the software product 152. The marketplace server 164 may also establish an account or update an account for a customer. In some examples, the billing server 168 may be configured to charge for access to the resources 130 that are accessed by the software product 152 while it is executing and/or the resources 130 that are accessed by a customer based on the subscriptions maintained by the customer. For example, the billing server 168 might bill a software provider or a customer for use of a resource 130. In some cases, the billing server 168 may generate an accounting record that may be used to generate an invoice that is provided to the customer accessing the resource 130, to the software provider, or to some other user.

In some examples, the software provider may specify the resources 130 that may be accessed by a software product 152 while executing and/or the resources 130 that may be accessed based at least in part on what subscriptions are associated with a customer. As discussed above, the resources 130 may be resources 130 that the software provider is authorized to access. In other cases, the owner or operator of the electronic marketplace 160 or the service provider network 120 may specify what resources 130 may be accessed. The information relating to what resources 130 may be accessed may be stored in the access policy 126. The access policy 126 might be associated with a role that may be used by the software product 152 to acquire the security credentials necessary to access the resource 130. More details on using a role are described below with regard to FIG. 2.

The access management server 122 is configured to provide functionality relating to providing access to one or more resources 130 to the software products 152 and/or to customers based on software product purchases, such as subscriptions. As illustrated in FIG. 1, the access management server 122 includes a resource information data store 128, one or more access policies 126 and a resource monitor 124. While the resource information data store 128, the access policy 126 and the resource monitor 124 are illustrated within the access management server 122, all or a portion of these components may be located in other locations. For example, the resource information data store 128 may be located externally from the access management server 122 at some other location in the service provider network 120 or in the electronic marketplace 160. Similarly, the resource monitor 124 may be part of the usage-monitoring server 170 illustrated in the electronic marketplace 160, and the like.

The access management server 122 may be configured to receive resource information specifying the resources 130 that are available to software products 152 when executing. For example, the access management server 122 may be configured to receive from a software provider computing device 150 what resources 130 are to be made available to a software product 152 that is executing. This resource information might be stored in the resource information data store 128 and/or within the access policy 126. The access management server 122 might also receive from the software provider computing device 150 what subscriptions are required to be maintained by a customer to access a resource 130.

According to an embodiment, a software provider uses a software provider computing device 150 to specify access options for the resources 130 that may be accessed when a software product 152 is executing, or what subscriptions are required to access a particular resource. The access options that are specified may be a variety of different options. For example, the access options may include, but are not limited to, access options that specify if a software product 152 includes access to a resource 130, when access to the resources expire, other software products that are accessible by the software product 152, APIs that are accessible by the software product 152, computing resources that might be used by the software product 152, and the like. The access options might also specify how to charge for use of the resource 130. For example, the customer executing the software product 152 accessing the resource 130 might be charged and/or the software provider might be charged when the resource 130 is accessed.

After a customer starts using the software product 152, the resource monitor 124 may be configured to monitor the usage of the software product 152 and to provide access to one or more of the resources 130 to the software product 152 based on the access policy 126. The resource monitor 124 might also be configured to monitor the usage of a resource 130 that is accessed by a software product 152 while the software product 152 is executing. The usage information that might be monitored may include information such as, but not limited to, usage time of the resources 130, usage time of the software product, a type of virtual machine instance utilized to execute the software product 152, a number of virtual machine instances utilized, the amount and type of computing resources requested, and the like.

Figure 2:
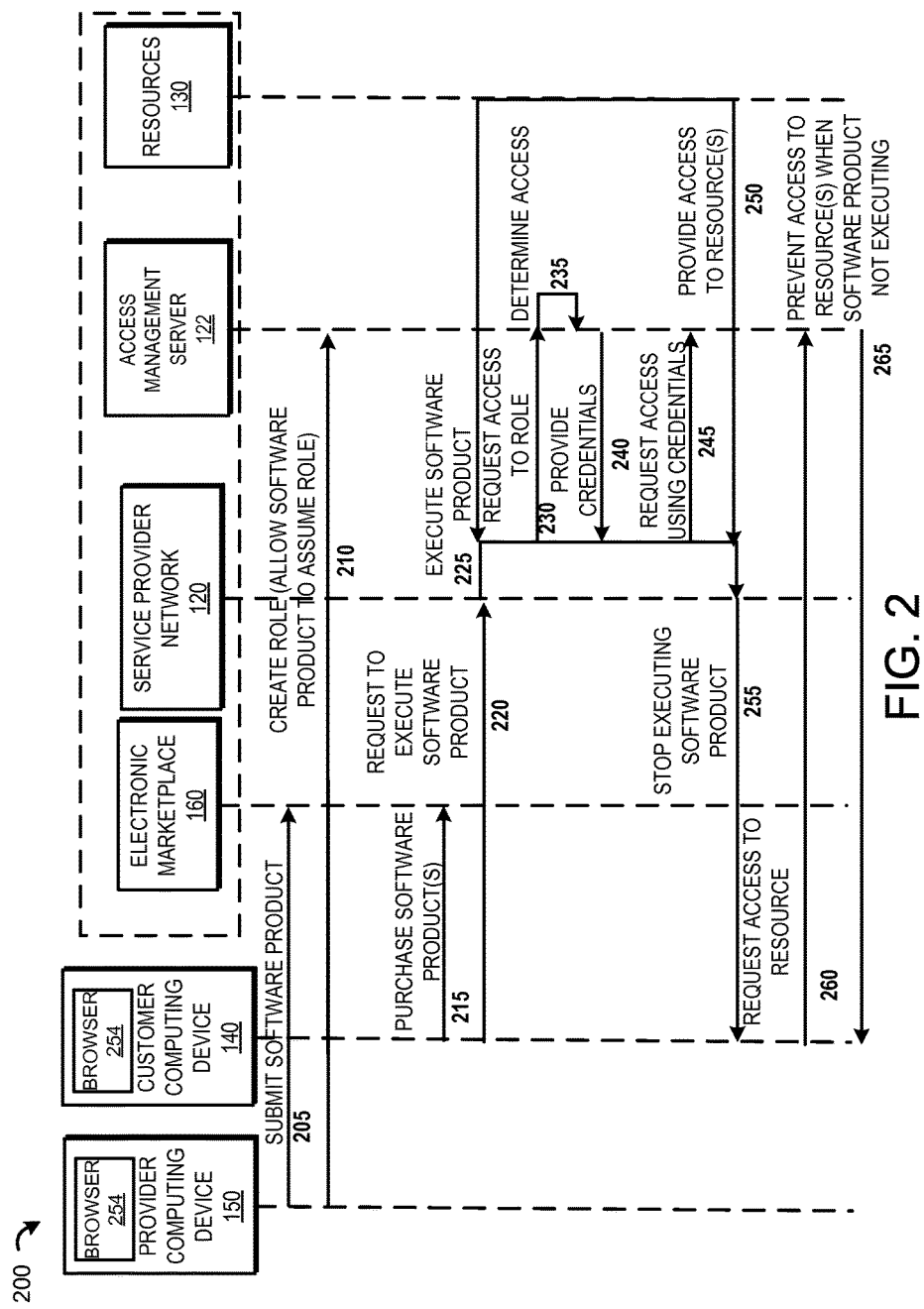
FIG. 2 is a sequence diagram that illustrates a customer accessing a resource of a software provider while a software product is executing.

FIG. 2 is a sequence diagram 200 that illustrates a customer accessing a resource 130 of a software provider while a software product 152 is executing. As illustrated, the sequence diagram 200 shows a customer computing device 140, a software provider computing device 150, an electronic marketplace 160, a service provider network 120, an access management server 122, and resources 130. In some examples, the electronic marketplace 160, the service provider network 120, the access management server 122 and the resources 130 may be associated with one another as indicated by the dashed line.

The customer computing device 140 and the software provider computing device 150 might include a Web browser 254, or some other type of user interface, to interact with the electronic marketplace 160 and/or the service provider network 120. For example, information presented by the browser 254 might be generated by the marketplace server 164 shown in FIG. 1, or some other server associated with the electronic marketplace 160 or the service provider network 120, and presented on a computing device, such as the customer computing device 140 or the software provider computing device 150.

Operation 205 illustrates a software provider submitting one or more software products 152 to an electronic marketplace 160. In example embodiments, a third party software provider, or some other authorized user, using the software provider computing device 150, may submit one or more software products 152 (e.g., virtual machine images that include software products) to the electronic marketplace 160. The electronic marketplace 160 may then make the submitted software product, as well as other software products 152 submitted to the electronic marketplace 160, available to customers.

Operation 210 illustrates a software provider, or some other authorized user, creating a role that may be associated with credentials of the software provider, and possibly other users. The software provider, or other authorized user, may set permissions that define what actions the role may perform. For example, the software provider may specify the permissions in an access policy 126 and associate the access policy 126 with the role. In some examples, the resources 130 that may be accessed (e.g., by a user or program that has assumed the role) are the resources that may be accessed by the software provider that supplied the software product 152 to the electronic marketplace 160. In other examples, the resources 130 that may be accessed are resources 130 that are authorized by the owner or operator of the electronic marketplace 160 or the service provider network 120 or some other authorized user to access. In some embodiments, the software provider associates the role with one or more software products 152.

Operation 215 illustrates the customer purchasing a software product 152 from the electronic marketplace. As discussed above, a customer may search or navigate through the electronic marketplace 160 to locate software products 152 that they are interested in acquiring. For purposes of explanation, and not intended to be limiting, assume that the user has located at least one software product 152 to purchase from the electronic marketplace 160. As discussed above, the purchase might be a subscription to the software product 152.

After purchasing the software product 152, a customer may use the customer computing device 140 to request to execute the software product 152 in the service provider network 120 as illustrated by operation 220. For example, a virtual machine instance containing the software product 152 may be executed on a server within a first service provided by the service provider network 120. In other examples, the software product 152 may be executed on a computing device that is not associated with the service provider network 120. For example, the software product may be executed on a server operated by the customer, or a different service provider. After the software product 152 begins executing, the software product 152 may request to access a role, as illustrated by operation 230. The access management server 122, or some other computing device, may determine whether the requesting software product is authorized to utilize the role. As discussed above, in some embodiments, the software provider that submitted the software product 152 to the electronic marketplace 160 specifies that the software product 152 is authorized to access the role.

When the software product is authorized to access the role as determined by the access management server 122, or some other computing device, the access management server 122 may be configured to return temporary security credentials to the requesting software product 152 as illustrated by operation 240. The temporary security credentials may be used by the software product 152 to access the specified resources 130 during the execution of the software product. In some examples, the temporary security credentials regularly expire, and the access management server 122 can be configured to issue new temporary security credentials for as long as the software product runs, a subscription to the software product has not expired, or in response to some other specified event (e.g., the software provider changing the permissions).

While the software product 152 is executing, the software product 152 may make requests (as illustrated by operation 245) to the specified resources 130 using the temporary credentials. In some examples, the software product 152 makes a web services request to access the one or more resources 130. The web services request may include data such as, but not limited to data that identifies the customer making the request, data that identifies the requested resource, data related to the credentials, or the like. In some examples, the resources 130 may be provided by a different service as compared to the service in which the software product is executing. As discussed above, the requested resource 130 might be any type of resource.

In response to the resource 130 being requested by the software product 152, the access management server 122, or some other computing device, determines whether to authorize the software product 152 to access the resource 130. For example, the access management server 122 may determine if the software product 152 is authorized to access the resource based, at least in part, on the temporary security credentials. In some embodiments, the request to access the resource 130 may come from another resource or service within the service provider network 120 (e.g., a cross-service request).

After the software product 152 stops executing (255) the temporary credentials will expire and the customer will not be able to access the resource. In the current example illustrated in FIG. 2, the customer computing device 140 requests access to a resource 130 at operation 260 when the software product 152 is no longer executing in the service provider network 120. Since the customer of the customer computing device 140 is not individually authorized to access the resource 130, the access management server 122 prevents access to the resource 130 at operation 265.

Figure 3:
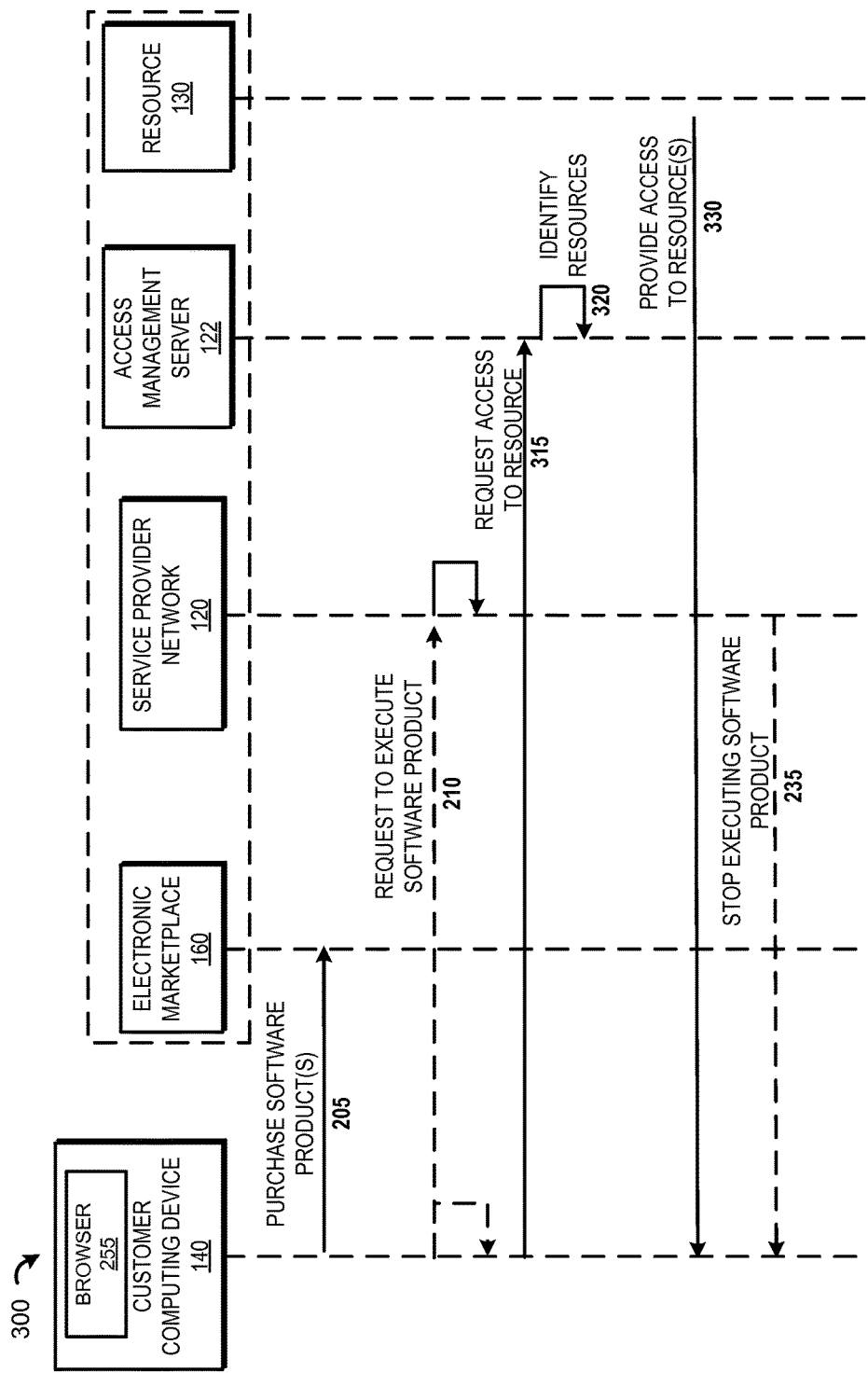
FIG. 3 is a sequence diagram that illustrates a customer accessing a resource based on subscriptions of the customer.

FIG. 3 is a sequence diagram 300 that illustrates a customer accessing a resource 130 based on subscriptions of the customer. The sequence diagram 300 includes the components as illustrated in FIG. 2 except for the software provider computing device 150.

As discussed above, a customer may search or navigate through the electronic marketplace 160 to locate software products 152 that they are interested in purchasing. In some cases, the customer using the customer computing device 140 purchases different software products 152. The purchased software products 152 might include subscriptions to one or more products or resources. For example, the subscriptions might relate to software and/or services provided by the service provider network 120. According to some embodiments, the customer might obtain a free subscription to a software product 152. The free subscription, or a paid subscription, might end after a specified time (e.g., a week, a month, after a number of uses). In other examples, the subscription may not end until the customer, or some other authorized user, ends the subscription.

After purchasing a software product 152, a customer may use the customer computing device 140 to launch the software product 152 in the service provider network 120. In some examples, the software product 152 may be executed in a first service of the service provider network 120. In other examples, the software product 152 might be executed on the customer computing device 140. In some cases, the software product 152 might request to access a resource 130 (e.g., using a web services request). As discussed above, the resource 130 might be provided by a different service provided by the service provider network as compared to the service of the service provider network used to execute an instance of the software product 152. The software product 152 might request to access a resource 130 that the software product 152 is not authorized to access, but the customer is authorized to access based on one or more current subscriptions or purchases of the customer as specified by the third party or some other authorized user associated with the service provider network 120.

As discussed above, a customer might be allowed to access a resource 130 if the customer has a subscription to another software product 152 or resource 130. In response to a request to access a resource 130 at operation 315, the access management server 122 at operation 320 may be configured to identify the resources 130 that the customer is authorized to access based on the subscriptions/purchases of the customer. In some cases, an access policy 126 might be examined by the access management server 122 to determine what resources 130, software products 152, or subscriptions are to be purchased by the customer in order for the customer to be authorized to access the resource 130.

In the current example, the access management server 122 identifies the customer making the request and determines whether the subscriptions of the customer using the customer computing device 140 allow access to the resource 130. For example, the access management server 122 may examine an access policy 126 that is associated with the resource that looks for the subscription(s) that may be used to access the resource. Access to the resources 130 might be based on a customer having a particular subscription or the customer having particular subscriptions. For example, the resources 130 might be made available if the customer has a particular set of subscriptions. In some configurations, the access management server 122 might access another computing device to determine whether the subscription is still valid (e.g., not expired).

According to some embodiments, as long as the customer is determined to have the authorized subscriptions (e.g., as specified by the access policy 126), the access management server 122 allows access to the resource 130 and may provide access to the resources 130 at operation 330. In the current example, the access management server 122 allows the software product 152 to access the resources 130 as long as the customer has the subscriptions as specified in an access policy 126. Even when a software product 152 stops executing (235), the customer using the customer computing device 140 might still be able access the resource based on the subscriptions of the customer. In other examples, the access management server 122 might restrict access to the resource 130 when the customer has the subscriptions specified in the access policy 126 and that the request to access the resource 130 is made by one or more authorized software products and/or services.

Figure 4:
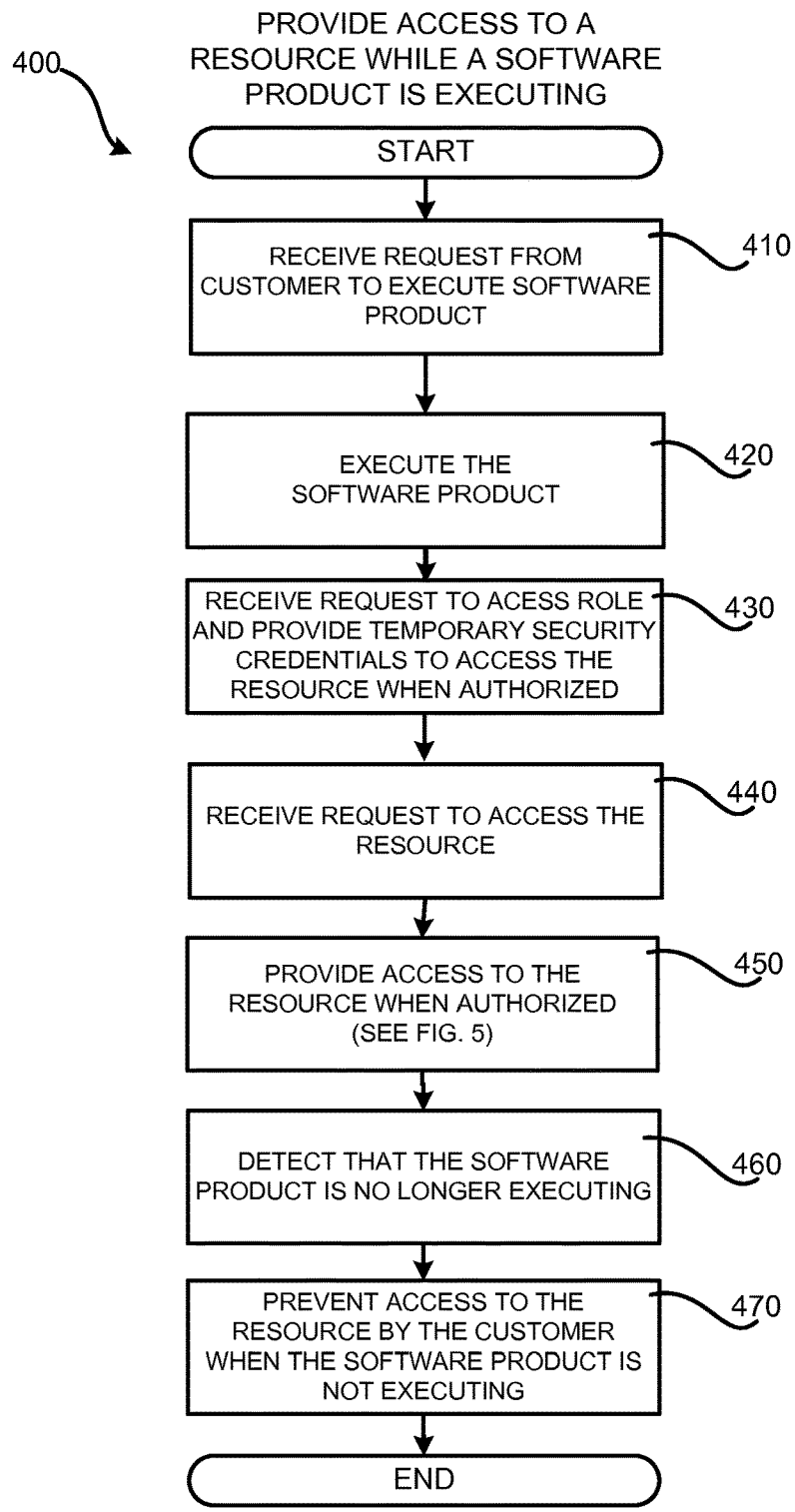
FIG. 4 is a flow diagram illustrating a routine for providing access to a resource while a software product is executing.
Figure 5:
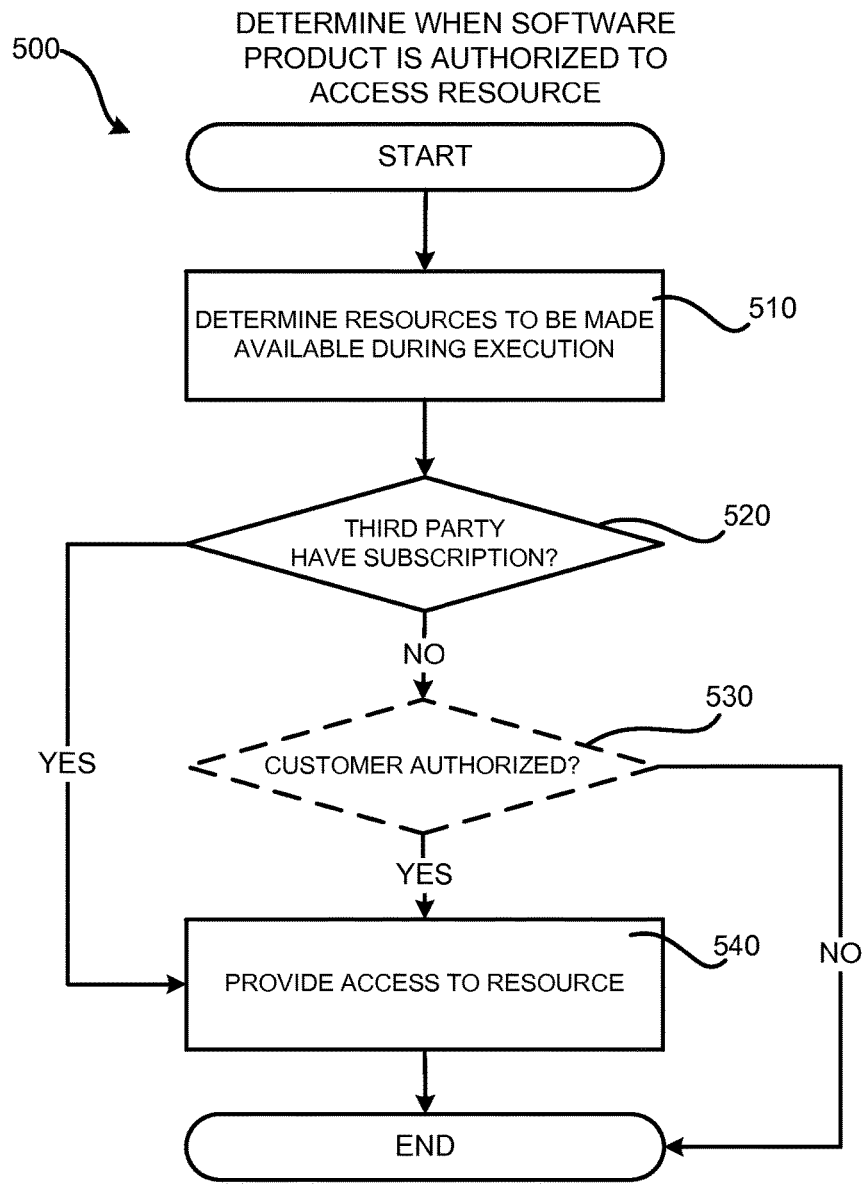
FIG. 5 is a flow diagram illustrating a routine for determining when a software product is authorized to access a resource while the software product is executing.
Figure 6:
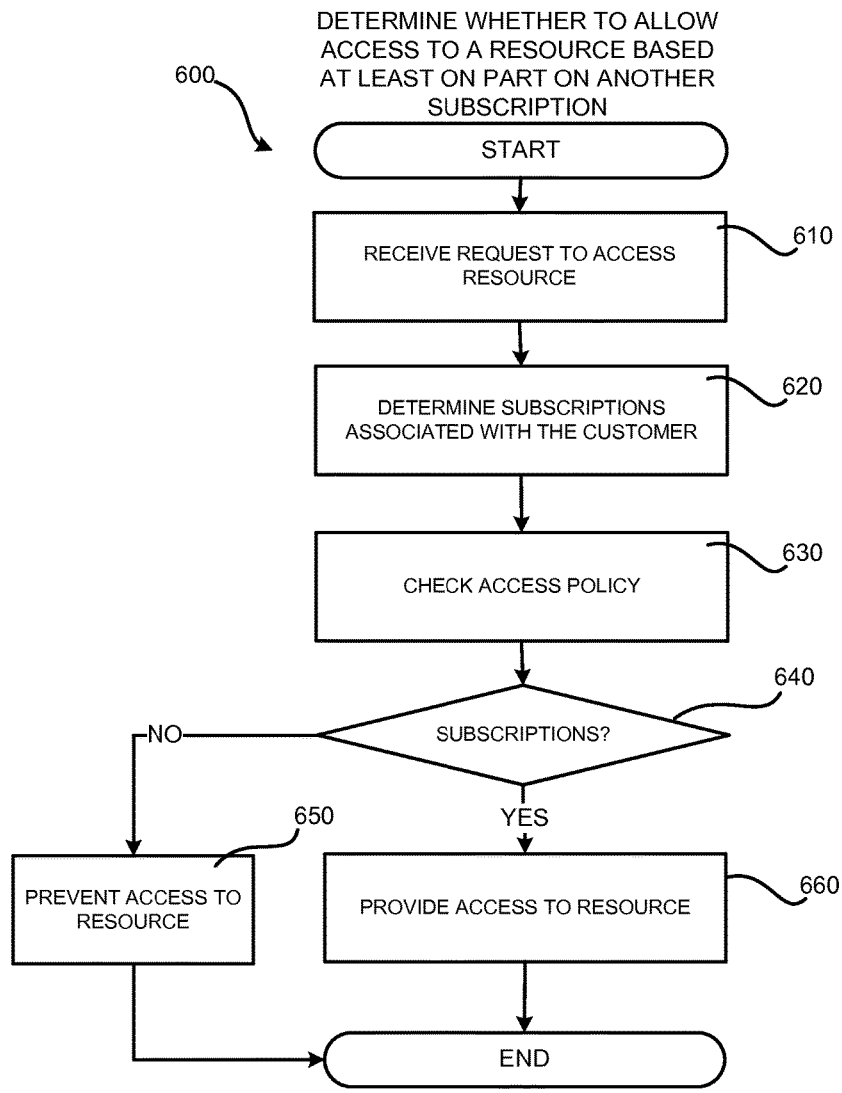
FIG. 6 is a flow diagram illustrating a routine for determining whether to allow access to a resource based at least in part on a subscription of a customer.

FIGS. 4-6 are flow diagrams showing routines that illustrate aspects of providing access to a resource, according to an embodiment disclosed herein. It should be appreciated that the logical operations described herein with respect to FIGS. 4-6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 4 is a flow diagram illustrating a routine 400 for providing access to a resource 130 while a software product 152 is executing. Routine 400 may begin at operation 410, where a request from a customer might be received to execute a software product 152. As discussed above, the request might be received from a customer computing device 140. In some examples, the request is to execute the software product 152 in a service provider network 120.

From operation 410, the routine 400 may proceed to operation 420, where the software product 152 is executed. As discussed above, the software product 152 might be executed in the service provider network 120 or in some other location (e.g., the customer computing device 140. For example, an instance of the software product 152 might be executed on a server in a first service provided by the service provider network 120.

From operation 420, the routine 400 may proceed to operation 430, where a request may be received from the software product 152 to access a role that may be used to request access to the resource 130. As discussed above, a role 130 may be created (e.g., by a software provider) that specifies what resources 130 are allowed to be accessed and what software products 152 are authorized to use the role. The software provider may also specify what actions the role can perform on the resource (e.g., read, write). As discussed above, a software provider, such as a third party software provider, might authorize the software product 152 to access one or more resources that the software provider is authorized to access. In other examples, the owner or operator of the service provider network 120 or the electronic marketplace 160 might authorize the software product 152 to access one or more resources 130 that it maintains. In some embodiments, when the software product is authorized to access the role 130 (e.g., as determined by the access management server 122), temporary security credentials are provided to the software product 152 that may be used to access the specified resources 130. In other embodiments, an access policy 126 might specify the resources 130 to be made available to the software product 152. From operation 430, the routine 400 may proceed to operation 440, where a request to access a resource 130 may be received. In some examples, the resource 130 is provided by a second service of the service provider network. As discussed above, the request may come from an instance of the software product 152 that is executing within the first service of the service provider network 120. In some embodiments, the request includes the temporary security credentials provided by the access management server 122 that authorizes the software product 152 to access to the resource 130 while the software product 152 is executing.

From operation 440, the routine 400 may proceed to operation 450, where the software product 152 is provided access to the resource 130. As discussed above, the access management server 122 may be configured to provide the software product 152 with access to the resource 130 when authorized. FIG. 5 provides more details on providing a software product 152 access to the resource 130 while it is executing.

From operation 450, the routine 400 may proceed to operation 460, where it may be detected that the software product 152 is no longer executing. For example, a notification might be provided by the software product 152 to the access management server 122 before the software product 152 stops executing. The resource monitor 124 or the usage-monitoring server 170 might also be configured to detect when the software product 152 is no longer executing.

From operation 460, the routine 400 may proceed to operation 470, where access to the resource 130 is prevented when the software product is not executing. As discussed above, in some examples, authorization to access the resource is prevented by the access management server 122 when the software product 152 is not executing. Routine 400 then proceeds to an end operation. Alternately, the routine 400 might proceed back to repeat some or all of the processing operations described above. For example, from operation 470, the routine 400 may proceed back to operation 410.

FIG. 5 is a flow diagram illustrating a routine 500 for determining when a software product 152 is authorized to access a resource 130 while the software product 152 is executing. The routine 500 may begin at operation 510, where a determination might be made as to what resources are to be made available to the software product 152 while the software product 152 is executing. As discussed above, a software provider, such as a third party software provider, might authorize the software product 152 to access one or more resources 130 that the software provider is authorized to access.

The resources 130 that are made available to the software product might be a service provided by the service provider network, data in the service provider network (or some other location), assumption of a role, and the like. In some examples, the resources 130 that are provided to the software product 152 during execution include the ability of the software product 152 to assume a role of another user (e.g., the software provider or some other authorized user) in order to perform operations restricted to that user. In other examples, the owner or operator of the service provider network 120 or the electronic marketplace 160 might authorize the software product 152 to execute one or more resources of the electronic marketplace 160 or the service provider network 120.

From operation 510, the routine 500 may proceed to decision operation 520, where a determination is made as to whether the authorized user (e.g., a third party software provider) is authorized to access the resource 130. As discussed above, the software provider might be authorized to access resources that the customer is not authorized to access. The resource 130 might be associated with a service provider network 120 or be a resource 130 that is maintained by the software provider or some other entity.

In response to the software provider being authorized at operation 520 to access the resource 130, the process 500 may flow to operation 540 where the software product 152 is provided access to the resource 130. In response to the software provider not being authorized to access the resource 130, the process 500 may flow to decision operation 530.

At decision operation 530, a determination might be made as to whether the customer is authorized to access the resource 130. As discussed above, a customer might be authorized to access a resource (e.g., the customer purchased access to the resource). In response to the customer being authorized to access the resource 130, the process 500 may flow to operation 540 where the software product 152 is provided access to the resource 130. In response to the customer not being authorized to access the resource 130, the process 500 may flow to an end operation.

FIG. 6 is a flow diagram illustrating a routine 600 for determining whether to allow access to a resource 130 based at least in part on a subscription of a customer. The routine 600 may begin at operation 610, where a request to access a resource 130 might be received from a customer. As discussed above, the request might be received from a customer computing device 140. In some examples, the request may be received from a service provider network 120.

From operation 610, the routine 600 may proceed to operation 620, where subscriptions associated with the customer are determined. A customer of the electronic marketplace 160 might purchase one or more subscriptions to different software products 152. In some examples, the billing server 168 or the marketplace server 164 may be configured to provide the subscription information for a customer. For example, the subscription information might be provided to the access management server 122.

From operation 620, the routine 600 may proceed to operation 630, where the access policy 126 that is associated with the resource 130 is checked. As discussed above, the access policy 126 might specify one or more subscriptions that are required to be associated with the customer before the customer is authorized to access the resource 130. The access policy 126 might be configured by the software provider or some other authorized user. For example, an owner or operator of the service provider network 120 or the electronic marketplace 160 might configure the access policy 126.

From operation 630, the routine 600 may proceed to decision operation 640, where a determination is made as to whether the customer has the required subscriptions to access a particular resource 130. For example, the access management server 122 may be configured to determine whether the customer has the required subscriptions to access a particular resource 130. In response to determining that the customer has the required subscriptions as specified by the access policy, the process 600 may flow to operation 660. In response to determining that the customer does not have the subscriptions required by the access policy 126 to access the resource 130, the process 600 may flow to operation 650 where access to the resource is prevented.

At operation 660, the customer may be provided with access to the resource 130. As discussed above, the access management server 122 may be configured to provide the customer with access to the resource 130. The routine 600 may then proceed to an end operation. Alternately, the routine 600 might proceed back to repeat some or all of the processing operations described above. For example, from operation 660, the routine 600 may proceed back to operation 610.

Figure 7:
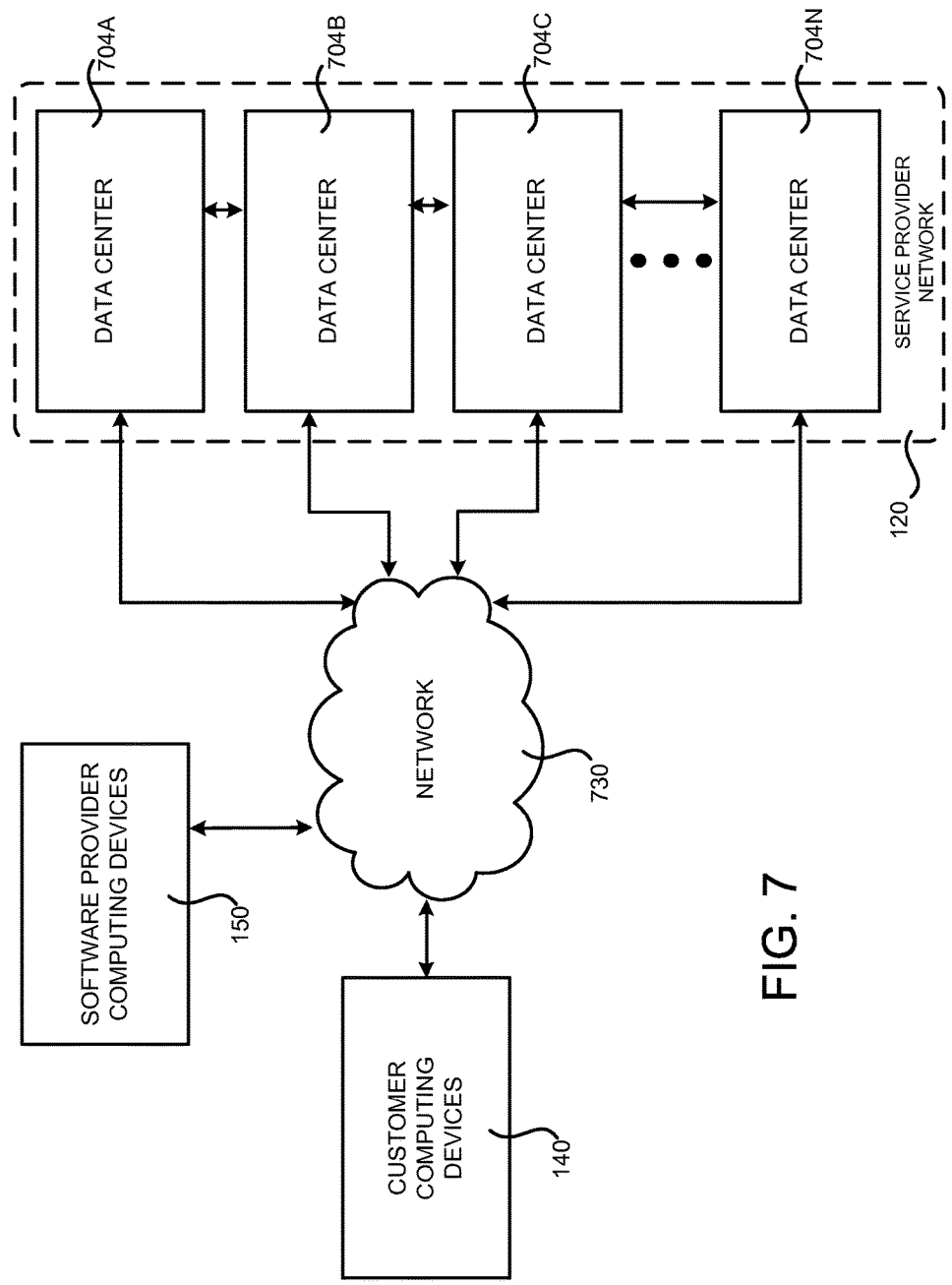
FIG. 7 is a system and network diagram that shows one illustrative operating environment for the embodiments disclosed herein that includes a service provider network.

FIG. 7 and the following description are intended to provide a brief, general description of a suitable computing environment in which the embodiments described herein may be implemented. In particular, FIG. 7 is a system and network diagram that shows an illustrative operating environment that includes a service provider network 120. As discussed above, service provider network 120 can provide virtual machine instances and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein for providing temporary access to resources in the service provider network 120 will be described below with regard to FIG. 8.

The users and customers of service provider network 120 may access the computing resources provided by the data centers 704 over a suitable data communications network, such as a Wide Area Network ("WAN"), as illustrated by network 730. Although a WAN might be used, it should be appreciated that a local-area network ("LAN"), the Internet, or any other networking topology known in the art that connects the data centers 704 to the customer computing devices 140, software provider computing devices 150 may be utilized. It should also be appreciated that combinations of such networks might also be utilized.

Figure 8:
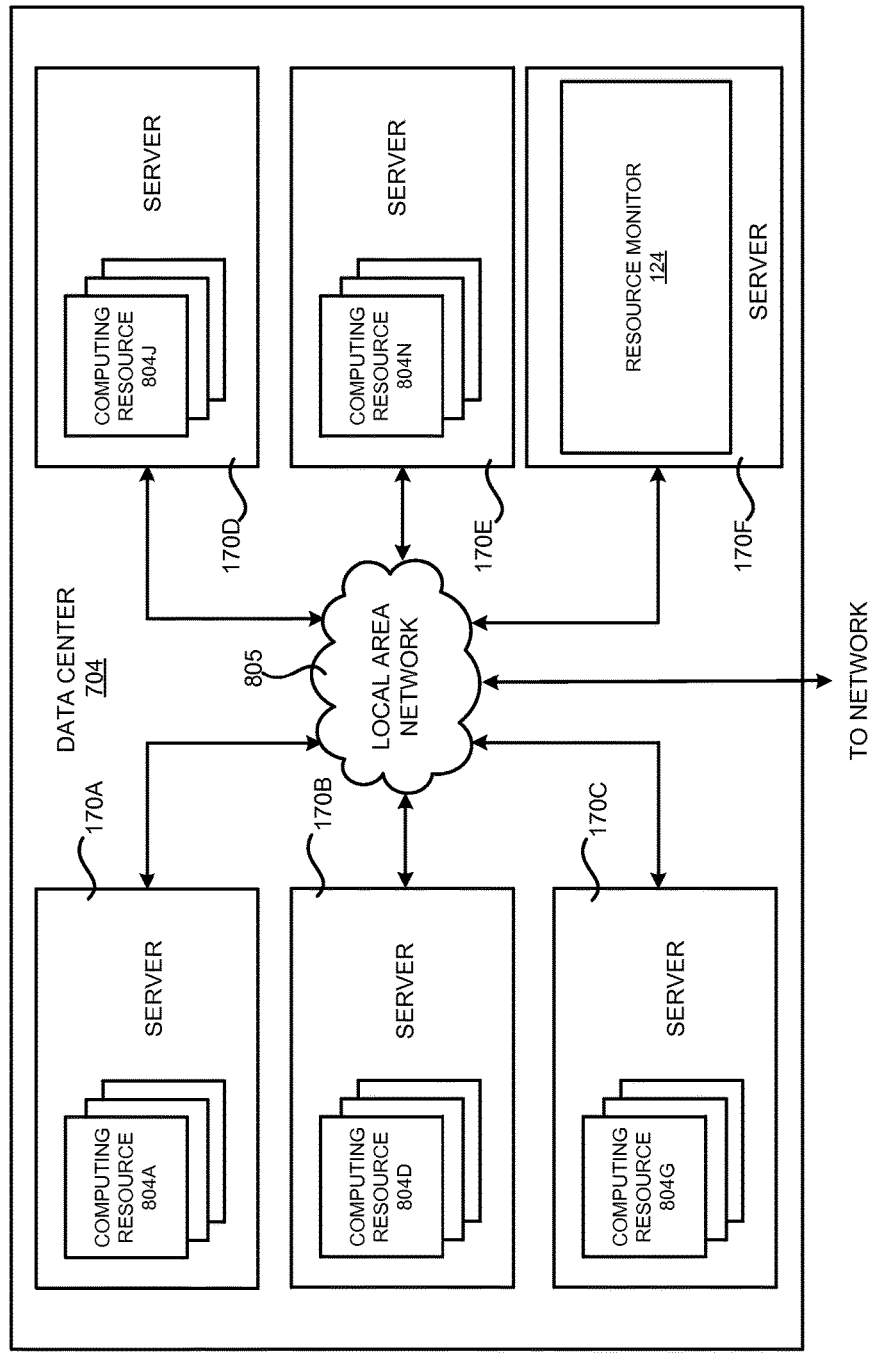
FIG. 8 is a computing system diagram that illustrates one configuration for a data center that implements aspects of a service provider network, including some or all of the concepts and technologies disclosed herein for providing access to a resource.

FIG. 8 is a computing system diagram that illustrates one configuration for a data center 704 that implements aspects of a service provider network 120, including some or all of the concepts and technologies disclosed herein for providing access to a resource. The example data center 704 shown in FIG. 8 includes several computers, such as servers 170A-170F (which may be referred to herein singularly as "a server computer 170" or in the plural as "the server computers 170") for providing computing resources. The server computers 170 may be standard tower or rack-mount server computers configured appropriately for providing the computing resources described herein. According to an embodiment, the server computers 170 are configured to execute the software products as described above.

In one embodiment, some of the computing resources 804 are virtual machine instances (e.g., virtual machine instances 172A-172N, not shown). As known in the art, a virtual machine instance is an instance of a software implementation of a machine (i.e. a computer) that executes programs like a physical machine. Each of the server computers 170 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 170, for example.

It should be appreciated that although the embodiments disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 704 shown in FIG. 8 also includes a server computer 170F reserved for executing software components for managing the operation of the data center 704, the server computers 170, virtual machine instances, and other resources within the service provider network 120. The server computer 170F might also execute the resource monitor 124. Details regarding the operation of this component have been provided above. In this regard, it should be appreciated that while these components are illustrated as executing within the service provider network 120, computing systems that are external to the service provider network 120 might also be utilized to execute some or all of these components. Other configurations might also be utilized.

In the example data center 704 shown in FIG. 8, an appropriate local area network ("LAN") 805 is utilized to interconnect the server computers 170A-170E and the server computer 170F. The LAN 805 is also connected to the network 130 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704A-704N, between each of the server computers 170A-170F in each data center 704 and between virtual machine instances and other types of computing resources provided by the service provider network 120.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
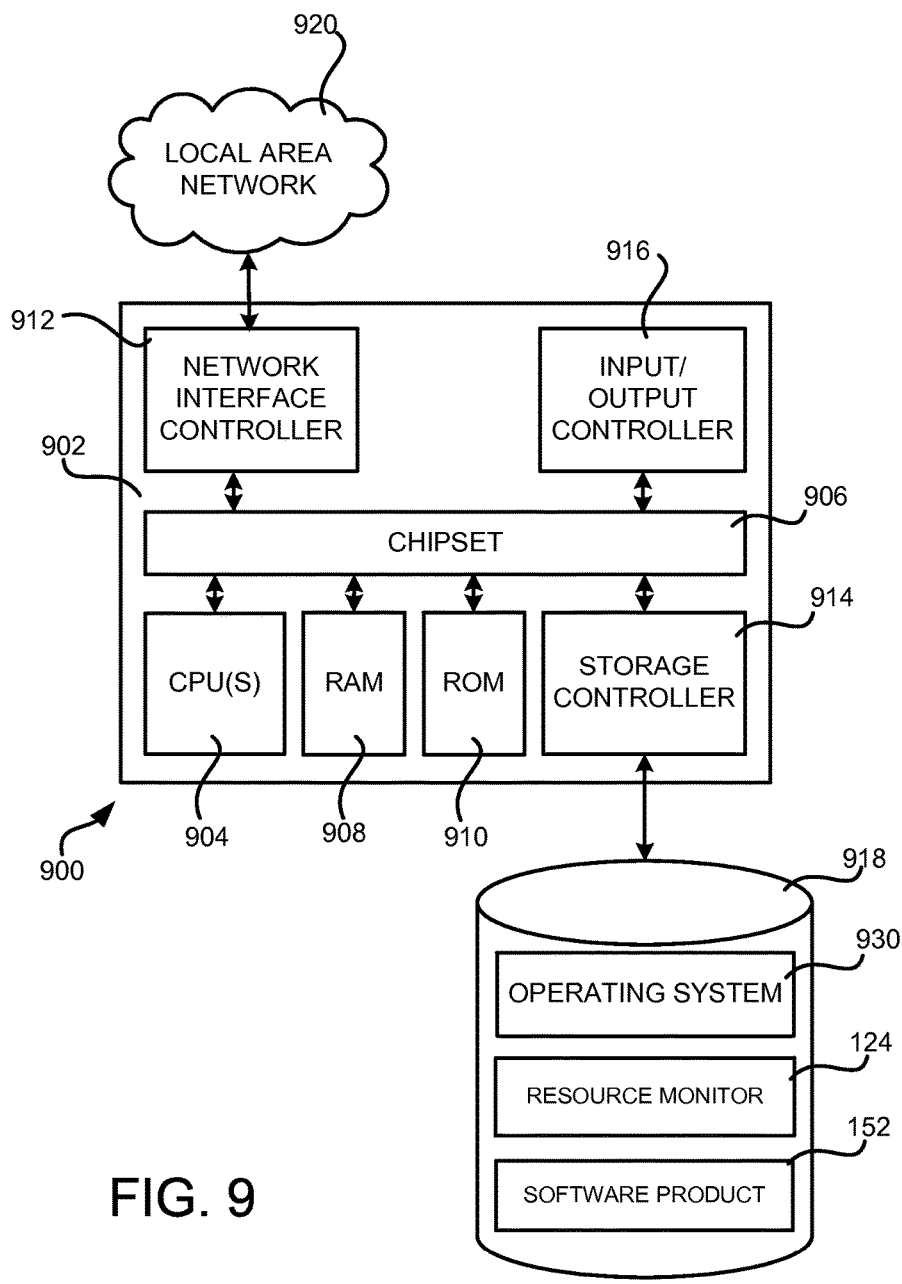
FIG. 9 is a computer architecture diagram showing one illustrative computer hardware architecture for implementing a computing device that might be utilized to implement aspects of the various embodiments presented herein.

FIG. 9 shows an example computer architecture for a computer 900 capable of executing program components for providing access to a resource or accessing a resource in the manner described above. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute software components for performing operations as described above. The computer architecture shown in FIG. 9 might also be utilized to implement a customer computing device 140, a software provider computing device 150 or any other of the computing systems described herein.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 920. The chipset 906 may include functionality for providing network connectivity through a network interface controller ("NIC") 912, such as a gigabit Ethernet adapter. The NIC 912 is capable of connecting the computer 900 to other computing devices over the local area network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX operating system. It should be appreciated that other operating systems may also be utilized. The mass storage device 918 may store other system or application programs and data utilized by the computer 900, such as components that include the resource monitor 124, the software product 152 and/or any of the other software components and data described above. The mass storage device 918 might also store other programs and data not specifically identified herein.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above with regard to FIGS. 4-6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for providing access to a resource have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system, comprising:
one or more computing devices operative to:
receive a first request, from a first computing device associated with a first customer of a service provider network, to execute a software product;
execute an instance of the software product within the service provider network on behalf of the first customer;
receive a second request, from the instance of the software product, to access a resource of the service provider network, wherein the first customer is not authorized to access the resource;
determine that a configuration provided by a second customer of the service provider network permits the instance of the software product to access the resource;
provide credentials to the instance of the software product to access the resource, wherein the credentials are used by the instance of the software product to access the resource, and
at least partly in response to a request from the first customer to access the resource, prevent the first customer access to the resource during a time the software product is not executing within the service provider network on behalf of the first customer.

2. The system of claim 1, wherein the configuration provided by the second customer is a role that is associated with an access policy that authorizes the software product to access the resource.

3. The system of claim 1, wherein the instance of the software product executes in a first service provided by the service provider network and the resource is available from a second service of the service provider network.

4. The system of claim 1, wherein the credentials usable to sign requests correspond to a role.

5. The system of claim 1, wherein the one or more computing devices are further operative to generate a third request to a second service provided by the service provider network to access the resource.

6. The system of claim 1, wherein the credentials provided to the instance of the software product expire when the instance of the software product stops executing in the service provider network.

7. The system of claim 1, wherein the second customer is a third-party software provider that provides the software product to the service provider network.

8. The system of claim 1, wherein the software product is available for purchase from an electronic marketplace that is associated with the service provider network.

9. The system of claim 1, wherein the one or more computing devices are operative to generate an accounting record for at least one of the first customer or the second customer for use of the resource.

10. A computer-implemented method to provide access to a resource during execution of a software product, the method comprising:
executing the software product on a first computing device in a service provider network on behalf of a customer of the service provider network;
receiving, at a second computing device operating in the service provider network, a second request from the software product to access a resource that is made available to the software product when executing in the service provider network, wherein access to the resource is based at least in part on a configuration of a third party, wherein the customer is not authorized to access the resource;
determining, by the second computing device, that the software product is authorized to access the resource;
providing to the software product, by the second computing device, credentials, usable to sign requests, to access to the resource;
providing, by one or more computing devices, the software product access to the resource while the software product is executing in the service provider network at least partly in response to receiving the credentials from the software product; and
at least partly in response to receiving a request from the first customer to access the resource, preventing the customer access to the resource during a time the software product is not executing in the service provider network on behalf of the customer.

11. The computer-implemented method of claim 10, further comprising preventing the software product from accessing the resource in response to detecting that the software product is not executing in the service provider network.

12. The computer-implemented method of claim 10, wherein determining that the software product is authorized to access the resource comprises checking one or more of an access policy or a role specified by the third party to identify the resource that the software product is authorized to access.

13. The computer-implemented method of claim 10, wherein the resource is as least one of: another software product; a service provided by the service provider network; or data available in the service provider network.

14. The computer-implemented method of claim 10, wherein the resource is a role that is assumed by the software product to access at least one of: another software product; a service provided by the service provider network; or data available in the service provider network.

15. The computer-implemented method of claim 10, wherein executing the software product comprises executing an instance of the software product in the service provider network.

\* \* \* \* \*